(12) United States Patent
Miyamura et al.

(10) Patent No.: US 6,659,607 B2
(45) Date of Patent: Dec. 9, 2003

(54) CONTACT LENS

(75) Inventors: Kazuya Miyamura, Kasugai (JP);
Keiji Sugimoto, Kasugai (JP); Tadashi Sawano, Ama-gun (JP); Shigeyasu Nagai, Kasugai (JP); Asaki Suzaki, Kasugai (JP); Hideaki Kondo, Okazaki (JP)

(73) Assignee: Menicon Co., Ltd. (JP)

( * ) Notice: Subject to any disclaimer, the term of this patent is extended or adjusted under 35 U.S.C. 154(b) by 0 days.

(21) Appl. No.: 10/056,545

(22) Filed: Jan. 24, 2002

(65) Prior Publication Data
US 2002/0101563 A1 Aug. 1, 2002

(30) Foreign Application Priority Data

Jan. 30, 2001 (JP) .......................................... 2001-022088
Dec. 10, 2001 (JP) .......................................... 2001-375469

(51) Int. Cl.$^7$ .............................. G02C 7/04; G02C 7/06
(52) U.S. Cl. .................................. 351/160 R; 351/161
(58) Field of Search .............................. 351/160 R, 161

(56) References Cited

U.S. PATENT DOCUMENTS 4,952,045 A    8/1990  Stoyan .................... 351/160 R
5,349,395 A  * 9/1994  Stoyan ........................ 351/161

FOREIGN PATENT DOCUMENTS

WO         WO 9852090 A1 * 11/1998 ............ G02C/7/04

* cited by examiner

Primary Examiner—Scott J. Sugarman
Assistant Examiner—Darryl J. Collins
(74) Attorney, Agent, or Firm—Rossi & Associates

(57) ABSTRACT

Disclosed is a contact lens including an optical zone having a substantially circular shape; an peripheral zone having an annular shape and located around the optical zone; and an intermediate zone having an annular shape and located between the optical and peripheral zones. The intermediate zone including a convex portion formed in at least one radial position of a back surface thereof so as to extend in a circumferential direction thereof with an outwardly curved surface as seen in a diametrical cross-section of the lens.

21 Claims, 6 Drawing Sheets

CONTACT LENS

INCORPORATED BY REFERENCE

The disclosure of Japanese Patent Application No. 2001-022088 filed on Jan. 30, 2001, and No. 2001-375469 filed on Dec. 10, 2001 including the specification, drawings and abstract are incorporated herein by reference in its entirety.

BACKGROUND OF THE INVENTION

1. Field of the Invention

The present invention relates generally to contact lens to be worn on a cornea of a human eye, which has a substantially circular optical zone and an annular peripheral zone disposed around the optical zone. More particularly, the present invention is concerned with such a contact lens, which is novel in construction and which is capable of enhancing lens wearing comfort as felt by a lens wearer.

2. Description of the Related Art

There is known a contact lens which is worn on a surface of a cornea of a human eye for treating myopia, hyperopia, astigmatism, presbyopia and the like. Since the contact lens is worn on the cornea accompanied with contact thereof with very sensitive surfaces of the cornea and eyelids of a lens wearer, there is a great need to enhance lens wearing comfort as felt by the lens wearer.

In general, the contact lens includes a substantially circular central optical zone serving for transmitting light to a pupil, and an annular peripheral zone disposed radially outwardly of the optical zone and serving for placing the contact lens on a predetermined position on the cornea. The peripheral zone is designed to permit a good circulation of tear fluid existing between the cornea and the contact lens. The optical zone has a back surface that is formed in a concave shape whose curvature is made substantially equal to that of the cornea of the lens wearer, so that the back surface of the optical zone of the contact lens may suitably fit the shape of the cornea of the lens wearer. This radius of curvature of the back surface of the optical zone of the lens is generally referred to as a base curve.

However, the conventional contact lens as described above gives rise to a problem of discomfort as felt by the contact lens wearer when he or she wear the lens, although degrees of the discomfort may vary among individual wearers. In particular, a conventional contact lens of hard or rigid type gives the lens wearer a relatively large wearing discomfort. Thus, the conventional contact lens is insufficient to assure a good wearing comfort thereof.

In addition, the conventional hard type contact lens is likely to suffer from a problem that dusts or other floating objects in the atmosphere are introduced into the tear fluid existing between the contact lens and the cornea. This results in significantly deterioration of the lens wearing comfort as felt by the lens wearer, and sometimes gives rise to a burden on the lens wearer to remove the contact lens to wash it.

SUMMARY OF THE INVENTION

It is therefore an object of this invention to provide a contact lens which is novel in structure, and which is capable of eliminating or minimizing a discomfort as felt by a contact lens wearer when he or she wear the contact lens, and assuring an improved wearing condition of the lens, while preventing an entrance of the dust or the like into a tear fluid portion between the lens and the cornea.

The above and/or other objects of this invention may be attained according to at least one of the following modes of the invention. Each of these modes of the invention is numbered like the appended claims and depends from the other mode or modes, where appropriate, to indicate possible combinations of elements or technical features of the invention. It is to be understood that the principle of the invention is not limited to those modes of the invention and combinations of the technical features, but may otherwise be recognized based on the thought of the present invention that disclosed in the whose specification and drawings or that may be recognized by those skilled in the art in the light of the disclosure in the whole specification and drawings.

(1) A contact lens comprising: (a) an optical zone having a generally circular shape; (b) an peripheral zone having a generally annular shape and located around the optical zone; and (c) an intermediate zone having a generally annular shape and interposed between the optical and peripheral zones, wherein the intermediate zone has a back surface provided with a convex portion formed in at least one diametrical position thereof and extending in a circumferential direction thereof with an outwardly curved surface in cross section taken in a plane parallel to a diametric direction of the contact lens.

In the contact lens according to this mode of the invention, the convex portion is disposed radially outwardly of the optical zone and extends in the circumferential direction of the contact lens so as to surround the optical zone. With the contact lens worn on a cornea of a lens wearer, this convex portion protrudes toward the cornea from a posterior surface of the contact lens, and is located closely adjacent to a surface of the cornea. A tear fluid layer existing between the posterior surface of the contact lens and the cornea is partially narrowed and restricted at a portion where the convex portion is opposed to the cornea. Therefore, the convex portion smoothly leads the posterior surface of the contact lens to be located adjacent to and positioned relative to the surface of the cornea with its smooth outwardly curved surface having no peak or junction.

Accordingly, the contact lens of the invention permits an improved lens wearing comfort as felt by the lens wearer. In addition, since the convex portion partially narrows the tear fluid layer, unfavorable entrance of dusts or other floating objects in the atmosphere into the tear fluid layer is effectively restricted or limited, thus assuring an enhanced usability of the contact lens. It is presumed that these advantages of the present contact lens, namely, the improved lens wearing comfort and the limitation of the entrance of the dusts into the tear fluid layer, stem from the following technical basis or reasons: (i) a barrier effect owing to a convex configuration of an alignment portion (that is contact with or most closely adjacent to the surface of the cornea) of the contact lens, i.e., the convex portion formed in the back surface of the intermediate zone that is opposed to and protrudes toward the surface of the cornea; and (ii) a stress diffusion effect owing to the outwardly curved surface of the convex portion of the intermediate zone, which permits the convex portion to be opposed to the surface of the corneal with a smooth surface.

A result of extensive research and study of the inventors reveals that the contact lens of this mode of the invention exhibits a high positioning stability on the cornea, while ensuring a reduced amount of displacement of the contact lens relative to the cornea when the lens wearer blinks, for example. Therefore, the contact lens of this mode of the invention enables to decrease or moderate discomfort as felt by the lens wearer due to friction between the contact lens and eyelid and/or cornea caused by the displacement of the contact lens relative to the cornea, resulting in further improved lens wearing comfort as felt by the lens wearer. This improvement of the lens wearing comfort may also stem from that the limited entrance of the dusts or other floating objects into a clearance between the contact lens and the cornea via the tear fluid existing and circulated between the contact lens and the cornea due to the presence of the narrowed portion of the tear fluid layer, as well as the above-indicated reduced displacement of the contact lens relative to the cornea.

Described more specifically, the contact lens of this mode of the invention is worn on the cornea and pressed onto the cornea upon application of an external pressing force thereon. Such an external pressing force is applied on an anterior surface of the contact lens, by the eyelids of the lens wearer, when the lens wearer blinks. As a result, the posterior surface of the contact lens is located adjacent to the surface of the cornea as close as possible, making it possible to restrict the displacement of the contact lens relative to the cornea. In this respect, the convex portion has the outwardly curved surface with no peak or junction, thus minimizing or eliminating adverse effects of the convex portion on the corner. Further, the convex portion does not adversely effect on the optical zone, since the convex portion is located radially outward of the optical zone.

This mode of the present invention is preferably applicable to a rigid gas permeable lens (RGPL) so that a sufficient amount of oxygen permeated through the contact lens is applied to the cornea, even if an amount of circulation of the tear fluid between the cornea and the contact lens is decreased. The principle of this mode of the invention is also applicable to a soft contact lens and a hard contact lens, which are made of polymethyl metacrylate (PMMA). In both cases, the contact lens of this mode of the invention is able to enjoy the advantages of the invention as mentioned above. Further, the principle of the present invention may be applicable to various kinds of known contact lens to be worn on the cornea for treating myopia, hyperopia, astigmatism, or the other disability or disease of a person's eye. The configuration of the convex portion is not particularly limited, but may preferably have a smooth curved surface whose radius of curvature is not too small to form a junction or a peak, so that the contact lens can be worn on the cornea with no or minimized adverse influence due to the contact of the convex portion with the cornea. Preferably, the convex portion is formed in an annular form extending continuously over its entire circumference of the contact lens. In order to regulate the tear fluid circulation between the contact lens and the cornea, this annular convex portion may have at least one cutout formed in a circumferential portion thereof such that the annular convex portion is divided into a plurality of circumferential parts due to the presence of the cutout.

(2) A contact lens according to the above-indicated mode (1), wherein the back surface of the intermediate zone has an inner circumferential portion connected to the optical zone and provided with a radially inner concave portion extending in a circumferential direction thereof with an inwardly curved surface in the diametrical cross section of the contact lens, the inwardly curved surface having a radius of curvature smaller than that of the optical zone and being connected at an outer circumferential portion to said convex portion. The contact lens according to this mode of the invention permits a smooth connection between the optical zone and the convex portion on the posterior surface of the contact lens, thereby providing a smooth surface on the overall back surface of the intermediate zone. This arrangement makes it possible to dimension the convex portion with a sufficiently large height, while assuring an excellent lens wearing comfort, resulting in an improved degree of freedom in designing the convex portion.

The configurations of the convex portion and the radially inner concave portion formed in the back surface of the intermediate zone may be suitably determined taking into account a height or a position of the convex portion, a curvature of the base curve (i.e., a curvature of the back surface of the optical zone) and efficiency in designing and manufacturing the contact lens. For instance, the convex portion and the radially inner concave portion are shaped in the diametrical cross section to have a desired configuration selected from a simple arcuate configuration, conic sections, configurations represented by polynomials of not less than second order, or the like.

(3) A contact lens according to the above-indicated mode (2), wherein the radially inner concave portion formed on the back surface of the intermediate zone is connected at the outer circumferential portion thereof to an inner circumferential portion of the convex portion with a continuous surface which joins to the outer circumferential portion of the radially inner concave portion along knots lying on tangents common to curves of the radially inner concave portion and the continuous surface, and joins to the inner circumferential portion of the convex portion along knots lying on tangents common to curves of the convex portion and the continuous surface. In the contact lens constructed according to this mode of the invention, the radially inner concave portion and the convex portion both formed in the back surface of the intermediate zone are connected to each other without creating any peaks or junctions at a boundary therebetween. This enables the convex portion to have a smoother surface, hence assuring a further improved lens wearing comfort as felt by the lens wearer. It should be appreciated that the continuous surface has a desired radial width that is suitably determined taking into account a desired lens design. It may be possible to form the continuous surface as a point or boundary as seen in the diametric cross section of the contact lens. In this case, the continuous surface lies on tangents common to both curves of the radially inner concave portion and the convex portion.

(4) A contact lens according to the above-indicated mode (2) or (3), wherein the outwardly curved surface of the convex portion and the inwardly curved surface of the radially inner concave portion have respective arcuate configurations in the diametrical cross-section of the contact lens. In the contact lens constructed according to this mode of the invention, the convex portion and the radially inner concave portion are effectively formed such that centers of arcs of said convex portion and said radially inner concave portion are located on the opposite sides of the posterior surface of the contact lens.

In the above-indicated modes (2)–(4), the concave portion may include a plurality of concave parts which are continuously connected to each other in the diametric direction of the contact lens, which have different arcuate configuration, as seen in the diametrical cross section of the lens, whose radiuses of curvatures are different from each other. In this case, the curvatures of the plurality of concave parts vary so as to gradually increase in the radially outward direction of the contact lens, preferably, so that the plurality of concave parts effectively serves for connecting the base curve of the back surface of the optical zone and the convex portion with a smoothly contiguous surface, even if the convex portion protrudes backwards from the back surface of the optical zone with a relatively large amount of height.

(5) A contact lens according to the above-indicated mode (2) or (3), wherein at least one of the outwardly curved surface of the convex portion and the inwardly curved surface of the radially inner concave portion has a configuration represented by any one of a conic section and a polynomial of not less than second order, in the diametrical cross section of the contact lens.

(6) A contact lens according to the above-indicated mode (2) or (3) of the invention, wherein the back surface of the intermediate zone including the convex portion and the radially inner concave portion has a configuration represented by any one of a polynomial and a trigonometric function in the diametrical cross-section of the lens. This arrangement makes it possible to design the entire back surface of the intermediate zone of the contact lens by utilizing only one equation, making it easy to calculate a shape design of the contact lens, while assuring smoothness of the entire back surface of the intermediate zone. For the trigonometric function, a sine function and a cosine function may be preferably used.

(7) A contact lens according to any one of the above-indicated modes (1)–(6), wherein the convex portion formed on the back surface of the intermediate zone is connected at an inner circumferential portion thereof to the optical zone with a first inwardly curve and at an outer circumferential portion thereof to the peripheral zone with a second inwardly curve, the convex portion protruding at least partially toward a back side of the contact lens from both of a radially outward prolongation of the back surface of the optical zone and a radially inward prolongation of the back surface of the peripheral zone in the diametrical cross section of the contact lens. In the contact lens constructed according to this mode of the invention, the optical zone, the intermediate zone and the peripheral zone are smoothly connected one another on the posterior surface of the contact lens in the diametric direction of the contact lens, thus providing a smoothly connected overall posterior surface of the contact lens. This smooth posterior surface of the contact lens effectively prevents or reduces occurrence of stress or stimulation concentration on a local area of the surface of the cornea, resulting in a further improved lens wearing comfort.

(8) A contact lens according to the above-indicated mode (1), wherein the convex portion formed on the back surface of the intermediate zone extends to an inner circumferential portion of the intermediate zone so as to be connected to the optical zone with a continuous surface which joins to the optical zone along knots lying on tangents common to curves of the optical zone and the continuous surface, and joins to the inner circumferential portion of the convex portion along knots lying on tangents common to curves of the convex portion and the continuous surface. This mode of the invention makes it possible to form the convex portion to be located adjacent to a peripheral portion of the optical zone and to be smoothly contiguously connected to the optical zone.

(9) A contact lens according to the above-indicated mode (8), wherein only one of the convex portion is formed on the back surface of the intermediate zone so as to extend over an entire radial length of the intermediate zone. This mode of the invention makes it possible to form the preferable convex portion on the back surface of the intermediate zone, while simplifying the configuration of the back surface of the intermediate zone.

(10) A contact lens according to any one of the above modes (1)–(9), wherein a posterior surface of the contact lens is arranged such that the intermediate zone is connected at an inner circumferential portion thereof to the optical zone with a first continuous surface which joins to the optical zone along knots lying on tangents common to curves of the optical zone and the continuous surface, and joins to the inner circumferential portion of the intermediate zone along knots lying on tangents common to curves of the intermediate zone and the continuous surface, while the intermediate zone is connected at an outer circumferential portion thereof to the peripheral zone with a second continuous surface which joins to the peripheral zone along knots lying on tangents common to curves of the peripheral zone and the continuous surface, and joins to the outer circumferential portion of the intermediate zone along knots lying on tangents common to curves of the intermediate zone and the continuous surface. The contact lens according to this mode of the invention has the posterior surface in which the optical zone, the intermediate zone and the peripheral zone are smoothly connected to one another in the diametrical direction of the contact lens over the substantially entire area of the back surface of the contact lens. This arrangement enables to eliminate or minimize a local interfere between the contact lens and the surface of the corneal, resulting in further improved lens wearing comfort as felt by the lens wearer. It should be appreciated that the first continuous surface may be constituted by common tangent points in which the optical and the intermediate zones are directly connected to each other and lie on tangents common to both curves of the back surfaces of the optical and intermediate zones, or alternatively may be constituted by a curved surface interposed between the optical zone and the intermediate zone and lies on tangents whose slopes are continuously changed over its entire width including connecting points to the optical zone and the intermediate zone as seen in the diametrical cross section of the lens. Likewise, the second continuous surface may be constituted by common tangent points in which the intermediate zones and the peripheral zone are directly connected to each other and lie on tangents common to both curves of the back surfaces of the intermediate and peripheral zones, or alternatively may be constituted by a curved surface interposed between the intermediate zone and the peripheral zone and lies on tangents whose slopes are continuously changed over its entire width including connecting points to the intermediate zone and the peripheral zone as seen in the diametrical cross section of the lens.

(11) A contact lens according to any one of the above-indicated modes (1)–(10), wherein the peripheral zone has a back surface including a plurality of concave parts that have respective arcuate configuration in the diametrical cross section of the contact lens whose radiuses of curvatures are different from each other, the plurality of concave parts being continuously connected to each other in a radial direction of the lens such that curvatures of the plurality of concave parts decrease as radial distances of the plurality of concave parts from the convex portion increase. This arrangement makes it possible to effectively form the peripheral zone in an outer circumferential portion of the posterior surface of the contact lens, even in the case where the convex portion protrudes backwards with a relatively large amount of protrusion (height) backward of the contact lens. In addition, this arrangement is effective to avoid a problem of deterioration of lens wearing comfort due to an increased wall thickness of the peripheral zone.

(12) A contact lens according to the above-indicated mode (9), wherein a back surface of the peripheral zone is formed as an outwardly curved surface or a tapered surface straightly extending radially outwardly so that the back surface of the peripheral zone protrudes backward of the contact lens so as not to exceed a radially outward prolongation of the back surface of the intermediate zone. In the contact lens constructed according to this mode of the invention, a single convex portion is formed over the entire area of the intermediate zone and at least inner circumferential portion of the peripheral zone. This arrangement makes it possible to form the convex portion that extends between the peripheral portion of the optical zone and the peripheral zone with an overall smooth surface.

In the contact lens constructed according to this mode (12) of the invention, the intermediate zone and the peripheral zone may not be separated from each other by a clear boundary formed therebetween, if the same radius of curvature is set to a portion ranging from the outer circumferential portion of the intermediate zone to the inner circumferential portion of the peripheral zone, for example. In this specific case of this mode of the invention, it might be considered that the convex portion is formed on the inner circumferential portion of the peripheral zone that is located adjacent to the peripheral portion of the optical zone. However, the presence of the convex portion disposed radially outward of the optical zone ensures the contact lens of this mode to exhibit the effects of the present invention as described above. Hence, it should be appreciated that the contact lens according to such a specific case of this mode (12) includes the intermediate zone in the form of the convex portion, and is accordingly included within the scope of the invention defined in the following claims.

(13) A contact lens according to any one of the above-indicated modes (1)–(11), wherein at least one of the intermediate zone and the peripheral zone, which are disposed radially outward of the convex portion, is provided with a radially outer concave portion extending in a circumferential direction thereof with an inwardly curved surface in the diametrical cross section of the contact lens, the inwardly curved surface having a radius of curvature smaller than that of the optical zone. In the contact lens constructed according to this mode of the invention, the intermediate or peripheral zone located radially outward of the optical zone protrudes toward the corneal and the sclera of the lens wearer's eye, making it possible to stably place the contact lens on the cornea such that the peripheral portion of the optical zone is spaced apart from the surface of the cornea with a distance larger than a distance between the central portion of the optical zone and the surface of the cornea. For this characteristic, the contact lens constructed according to this mode (13) is suitably used for in a so-called "orthokeratology" treatment. In order to effectively provide a contact lens for the orthokeratology treatment, a difference between the radius of curvature: Ra of the optical zone and the radius of curvature: Rb of the radially outer concave portion is preferably held within a range of −1 mm −1 mm (−1 mm≦(Ra−Rb)≦. 1 mm), more preferably is held within a range of −0.5 mm–0.5 mm (−0.5 mm≦(Ra−Rb)≦. 0.5 mm). In order to provide a contact lens for an abnormal curvature correction, the radius of curvature: Ra of the optical zone is made smaller than the radius of curvature: Rb of the radially outer concave portion (Ra<Rb).

(14) A contact lens according to any one of the above-indicated modes (1)–(13), wherein the back surface of the optical zone has a curvature that is made smaller than a curvature of the cornea, and a radially inner portion of the back surface of the intermediate zone located radially inward of the convex portion serves as a tear fluid reserving portion. In this mode of the invention, a central portion of the optical zone is adapted to apply a pressing force on a central portion of the surface of the cornea, to thereby reshaping the cornea. A refractive power of the cornea itself is desirably changed due to the reshaping of the cornea, thus reducing a myopic condition in a so-called "orthokeratology" manner. That is, the contact lens according to this mode of the invention is effectively used in the orthokeratology treatment. As disclosed in U.S. Pat. No. 4,952,045, for example, operations, effects or usage of the contact lens in the orthokeratology treatment are well known in the arts. For this reason, no detail description of this matter is provided for the sake of simplicity of the description. In the contact lens according to this mode of the invention, particularly, the central portion of the optical zone and the convex portion, which are to be located most closely adjacent to the cornea, have a smooth surface. Therefore, the present contact lens permits good wearing comfort as felt by the lens wearer and eliminated or reduced adverse effects on the cornea, while exhibiting a desired cornea reshaping effect as a primary effect.

(15) A contact lens according to any one of the above-indicated modes (1)–(14) wherein the peripheral zone has an outer diameter within a range of 8–16 mm. In general, contact lenses have a diameter of 11 mm or smaller. On the other hand, the contact lens according to this mode of the invention enables to have a relatively large diameter thereof. This arrangement assures that the eyelids of the wearer apply a relatively large pressing force on the upper surface of the contact lens, making it possible to position the contact lens on the cornea with further improved stability, and to further enhance lens wearing comfort as felt by the lens wearer, or alternatively making it possible to apply the contact lens to the orthokeratology treatment for further facilitating reshaping of the cornea with enlarged abutting pressure of the contact lens on the cornea. As is understood from the aforementioned description with respect to this mode of this invention, the contact lens of this mode is applicable to a sclera lens as well as the corneal contact lens.

(16) A contact lens according to any one of the above-indicated modes (1)–(15), wherein the optical zone has a radial width within a range of 40–70% of a radius of the contact lens, and the intermediate zone has a radial width within a range of 20–45% of the radius of the contact lens, while the peripheral zone has a radial width within a range of 5–25% of the radius of the contact lens. In the contact lens constructed according to this mode of the invention, the optical zone is able to effectively provide an excellent eyesight or a high degree of acuity of viewing with a suitable amount of light. The intermediate zone has the back surface in which the convex portion and the concave portion (which may formed as needed) are formed with smoothly curved surfaces without abrupt change in their curvature, thereby exhibiting an excellent wearing comfort. Further, the peripheral zone is capable of adjusting a stability of the contact lens on the cornea, a tear fluid circulation capacity of the lens, and a diameter of the lens.

In the contact lens constructed according to any one of the above-indicated modes (1)–(16), the configuration of the optical zone is not particularly limited. For the myopic treatment, the optical zone may preferably have a spherical surface whose curvature is similar to that of the surface of the cornea. For the orthokeratology treatment, the optical zone may preferably have a spherical surface whose curvature is made smaller than that of the surface of the cornea. Alternatively, the optical zone may have the diametrical cross sectional shape in the form of a conic section, e.g., ellipse, parabola, hyperbola, or the like.

The contact lens constructed according to any one of the above-indicated modes (1)–(16) may be manufactured according to various kinds of method of producing hard-type or soft-type contact lenses. For instance, the contact lens of the present invention may be manufactured by molding using a mold having a mold cavity whose profile corresponding to a desired profile of the contact lens. The contact lens of the invention may also be manufactured by injection molding, or alternatively by cutting in which a desirably shaped contact lens is cut out from a lens blank by utilizing techniques of turning. Further, a polishing process may be performed on the present contact lens as needed, like in the general process of manufacturing contact lenses.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings in which.

DETAILED DESCRIPTION OF PREFERRED EMBODIMENTS

Figure 1:
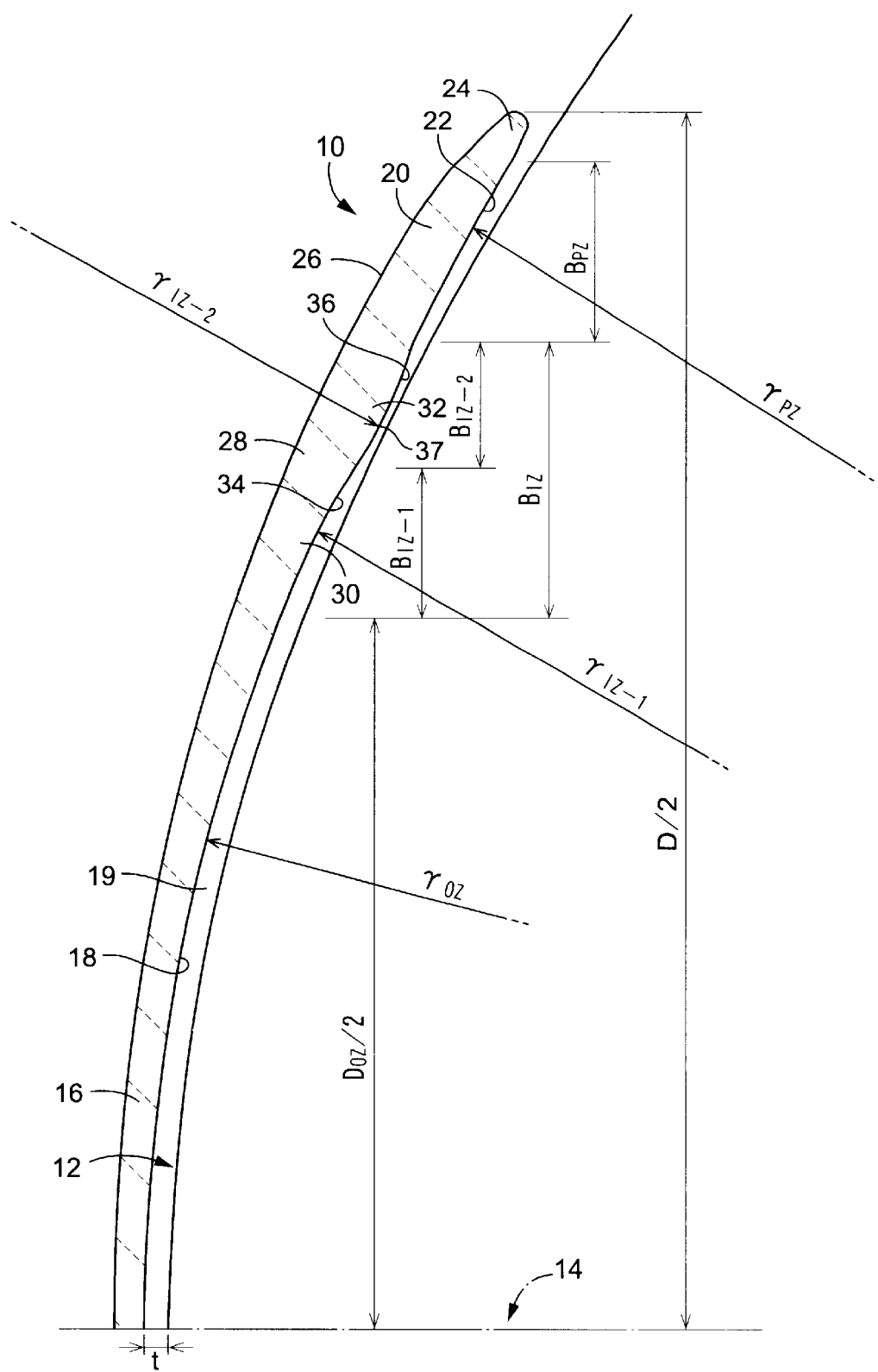
FIG. 1 is a fragmentary view in diametrical cross section of a contact lens according to a first embodiment of the present invention.
Figure 2:
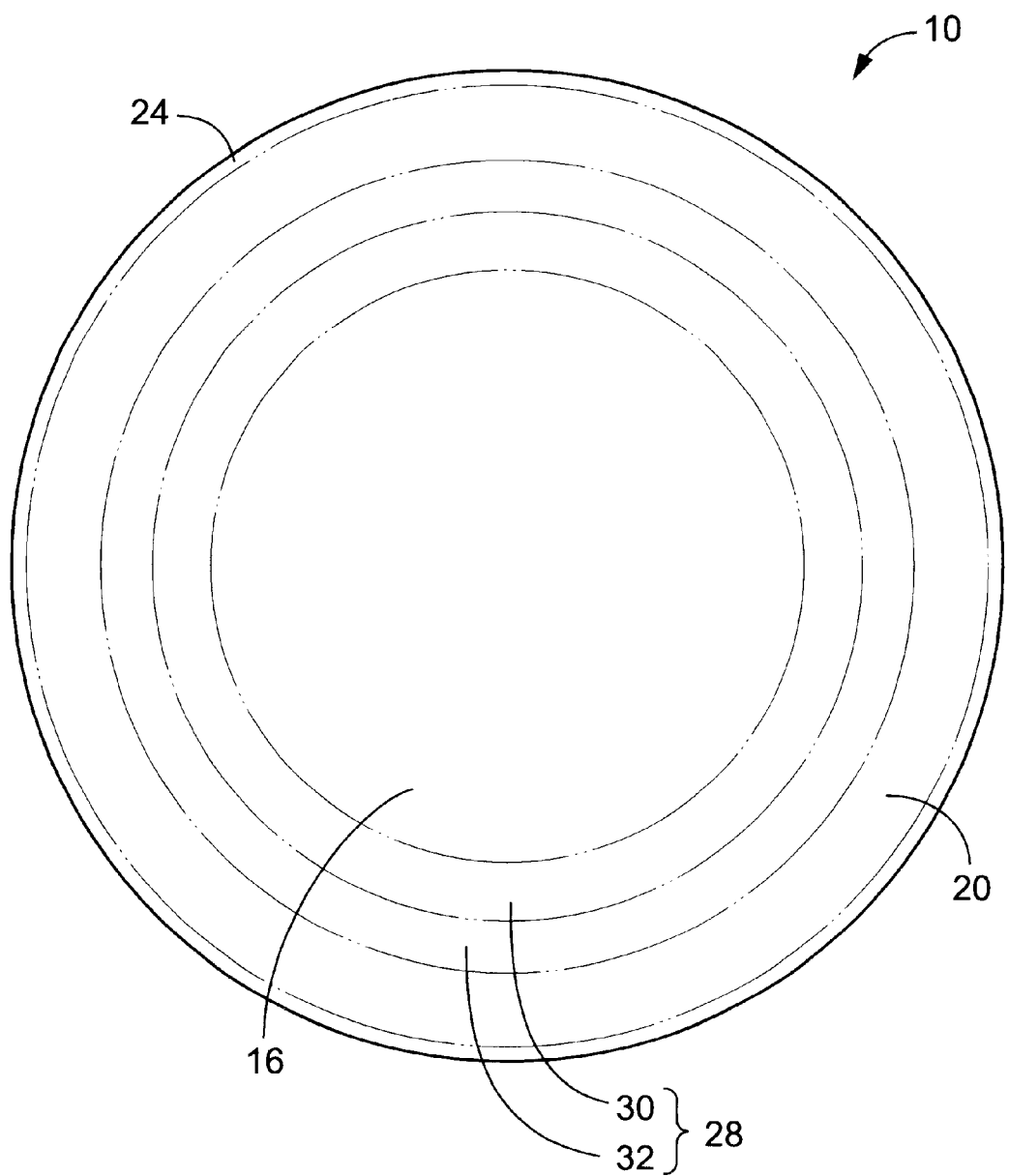
FIG. 2 is a rear elevational view of the contact lens of FIG. 1.

Referring first to FIGS. 1 and 2, there is shown a contact lens 10 constructed according to a first embodiment of the present invention. The contact lens 10 has a generally dome shape in its entirety, and is adapted to be worn on a cornea 12 of a lens wearer with its posterior surface held in contact with a surface of the cornea via tear fluid. The contact lens 10 has a center axis 14 substantially aligned with an optical axis of the lens, and is shaped as a solid of revolution about the center axis 14. For the sake of this geometrical feature of the contact lens 10, FIG. 1 shows only a symmetrical half of the contact lens 10 in its diametrical cross section.

More specifically described, the contact lens 10 includes an optical zone 16 formed in its central portion. This optical zone 16 is formed in a circular shape as seen in a front view of the contact lens 10, and has a center located on the center axis 14. The optical zone 16 has a diameter: Doz which is made substantially equal to a value of 60% of a diameter: D of the contact lens 10. The optical zone 16 has a back surface 18 serving as a base curved surface of an arcuate profile as seen in its diametrical cross section, whose center of curvature is located on the center axis 14 at the back side of the contact lens 10 (at the right-hand side of FIG. 1). A radius of curvature: $r_{oz}$ of the back surface 18 of the optical zone 16 is suitably determined so that the back surface 18 has a topography substantially similar to that of the surface of the cornea 12 when the contact lens 10 is worn on the cornea 12.

With the contact lens 10 worn on the cornea 12, a tear fluid layer 19 exists between the back surface 18 and the surface of the cornea 12. The tear fluid layer 19 is arranged to have a substantially constant thickness: t over the entire area so as not to function as a lens as much as possible.

This optical zone 16 is an area expected to provide an optical effect on the eye of the lens wearer, and is adjacent to an intermediate zone 28 which will be described later. A boundary between the optical zone 16 and the intermediate zone 28 is generally considered as a turning of the curvature, and needs not to be clear in configuration. For instance, the boundary may have a given radial width and is formed as a connecting portion for a smooth connection between the optical zone 16 and the intermediate zone 28.

The contact lens 10 further includes a peripheral zone 20 formed in its peripheral portion. This peripheral zone 20 has an annular shape as seen in the front view of the contact lens 10, whose center is located on the center axis 14 of the contact lens 10, and whose radial width dimension: $B_{PZ}$ is made substantially equal to a value of 15% of the radial dimension: D/2 of the contact lens 10. The peripheral zone 20 has a back surface 22 (hereinafter referred to as "back peripheral zone 22") of an arcuate profile as seen in its diametrical cross section, whose center of curvature is located on the center axis 14 at the back side of the contact lens 10 (at the right-hand side of FIG. 1). A radius of curvature: $r_{pz}$ of the back peripheral zone 22 is made larger than the radius of curvature: $r_{oz}$ of the back surface 18 of the optical zone 16 (i.e., the base curve) so that the back peripheral zone 22 is spaced away from the cornea such that a clearance between the cornea 12 and the back peripheral zone 22 slightly increases with an increase in a distance of the peripheral portion from the optical zone 16 in a radially outward direction of the contact lens 10. The contact lens 10 includes an outer most peripheral portion formed with a bevel 24 in its posterior surface. The bevel 24 has a substantially annular shape as seen in the front view of the contact lens 10, and is connected at its inner circumferential portion to an outer circumferential portion of the back peripheral zone 22 and at its outer circumferential portion to a front surface 26 of the contact lens 10 with a substantially semi-circular cross sectional shape. As is apparent from FIG. 1, the bevel 24 has a chamfered shape as seen in its diametrical cross section.

Further, the contact lens 10 includes the above-mentioned intermediate zone 28 in its radially intermediate zone, which is located between the optical zone 16 and the peripheral zone 20. This intermediate zone 28 has a substantially annular shape as seen in the front view of the lens whose center is located on the center axis 14 of the contact lens 10, and whose a radial width: $B_{IZ}$ is made substantially equal to a value of 20% of a radius dimension: D/2 of the contact lens 10. The intermediate zone 28 is directly continuously connected at its inner circumferential portion to a periphery of the optical zone 16 and at its outer circumferential portion to an inner circumferential portion of the peripheral zone 20, so that the optical zone 16 and the peripheral zone 20 are integrally connected to each other via the intermediate zone 28.

The intermediate zone 28 has a back surface provided with a radially inner concave portion in the form of a concave portion 30 located in a radially inner portion thereof and a convex portion 32 located in a radially outer portion thereof. These concave and convex portions 30, 32 are formed in an annular shape as seen in the top plane view of the contact lens 10 whose centers are both located on the center axis 14 of the contact lens 10. The convex portion 32 has a radial width: $B_{IZ-2}$ which is made slightly larger than a radial width: $B_{IZ-1}$ of the concave portion 30.

The concave portion 30 has an inwardly curved surface 34 of an arcuate profile as seen in its diametrical cross section, whose center of curvature is located on the back side of the contact lens 10 and whose radius of curvature: $r_{IZ-1}$ is made smaller than the radius of curvature: $r_{OZ}$ of the back surface 18 of the optical zone 16 as the base curve. On the other hand, the convex portion 32 has an outwardly curved surface 36 of an arcuate profile as seen in its diametrical cross section, whose center of curvature is located on the front side of the contact lens 10. A radius of curvature: $r_{IZ-2}$ of the outwardly curved surface 36 of the convex portion 32 may be suitably determined so that the convex portion 32 does not cause undesirable pressure or stimulation concentration on the corresponding portion of the surface of the cornea 12, while taking into account the radial width: $B_{IZ-2}$ of the convex portion 32 or the like. Generally, the radius of curvature: $r_{IZ-2}$ of the outwardly curved surface 36 of the convex portion 32 is dimensioned to be smaller than the radius of curvature: $r_{oz}$ of the back surface 18 of the optical zone 16 as the base curve, and to be substantially equal to the radius of curvature: $r_{IZ-1}$ of the inwardly curved surface 34 of the concave portion 30.

The concave portion 30 is connected at its inner circumferential portion to the periphery of the back surface 18 of the optical zone 16 along points or knots lie on tangents common to both curves of said concave portion 30 and the back surface 18. Namely, a first continuous surface is constituted by common tangent points in which the optical zone 16 and the inner circumferential portion of the concave portion 30 are connected to each other while lying on tangents common to both curves of them, in the present embodiment. Likewise, the concave portion 30 is connected at its outer circumferential portion to the inner circumferential portion of the convex portion 32 along points or knots lie on tangents common to both curves of the concave portion 30 and the convex portion 32. That is, the posterior surface of the contact lens 10 is formed as a smoothly continuous curved surface without any junctions or peaks over the optical zone 16 and the intermediate zone 28.

As shown in FIG. 1, the convex portion 32 protrudes outwardly (backwards of the contact lens 10) from both of a radially outward prolongation of the back surface 18 of the optical zone 16 and a radially inward prolongation of the back peripheral zone 22. In this arrangement, a vertex 37 of the convex portion 32, which has no junction or peak, is located most closely adjacent to the surface of the cornea 12 when the contact lens 10 is worn on the cornea 12. Namely, the convex portion 32 is smoothly contiguous to the concave portion 30 such that the convex portion 32 is formed on and protrudes outwards or backwards from a prolongation of the base curve of the contact lens 10. The convex portion 32 is also contiguous to the back peripheral zone 22 at a radial portion located radially outwardly of the vertex 37 where the height of the convex portion 32 decreases. In this respect, while the convex portion 32 and the back peripheral zone 22 may join together with creating junctions or peaks, preferably, they join together with a smooth junctionless connecting surface such as an arcuate shaped curve having a desired curvature. More preferably, the overall back surface includes the convex portion 32 and a knot between the convex portion 32 and back peripheral zone 22 is formed as a continuous surface that lies on tangents whose slopes are continuously changed in the radial direction as seen in the diametrical cross section of the contact lens 10 of FIG. 1.

The front surface 26 of the contact lens 10 has a suitably arranged configuration so that the front surface 26 and the back surface 18 of the optical zone 16 cooperate to apply a desired degree of dipodic power to the optical zone 16 of the contact lens 10. For instance, the configuration of the front surface 26 of the contact lens 10 may be determined on the basis of a known optical calculation formula, a know optics tracking method, or any other useful known method, while taking into account the configuration of the back surface 18 of the optical zone 16 and additionally the shape of the cornea 12, as needed. As is explained by way of example, the front surface 26 may be formed to have a spherical shape with a substantially uniform radius of curvature over its entirely, or alternatively may be formed to have an aspherical shape whose radius of curvature is gradually or continuously vary in the diametrical direction.

A material for the contact lens 10 constructed as described above may be preferably selected from suitable rigid gas-permeable materials. The contact lens 10 may be formed by molding with a mold or by cutting.

The contact lens 10 constructed according to the present embodiment as described above is worn on the surface of the cornea 12 with the convex portion 32 of the intermediate zone 28 disposed radially outwardly of the optical zone 16 being located most closely adjacent to the surface of the cornea 12. Therefore, an abutting pressure of the contact lens 10 applied on the cornea 12 is maximized or concentrated at the convex portion 32. In particular, when an upper and a lower eyelids of the lens wearer cover the periphery of the contact lens 10, and when the wearer blinks and his or her eyelids covers the contact lens 10 entirely, the eyelids of the lens wearer applies a pressing force on the front surface 26 of the contact lens 10. This pressing force applied on the front surface 26 of the contact lens 10 forcedly presses the convex portion 32 onto the surface of the cornea 12, thus positioning the contact lens 10 on the cornea 12 with the convex portion 32 being substantially held in contact with or closely adjacent to the surface of the cornea 12.

Thus, the abutting pressure of the contact lens 10 is concentrically acts on the underlying cornea 12 at around the optical zone 16, directly or indirectly via the tear fluid. This may cause a deformation of the cornea 12 due to the pressing force applied on the peripheral portion of the cornea 12 as the case may be. Owing to the abutting pressure concentrically generated around the optical zone 16, the contact lens 10 is effectively positioned on the cornea 12, and an amount of displacement of the contact lens 10 on the cornea 12 is effectively eliminated or reduced.

Therefore, the contact lens 10 according to the present embodiment is capable of minimizing the amount of displacement thereof relative to the cornea 12, without any adverse effects on a refractive power correction capability of the optical zone 16. Further, the contact lens 10 of this embodiment is able to decrease discomfort as felt by the lens wearer owing to the minimized displacement thereof over the cornea 12, resulting in improved lens wearing comfort.

In addition, the tear fluid layer 19 existing between the contact lens 10 and the cornea 12 is constructed at the outer circumferential portion of the contact lens 10 due to the presence of the convex portion 32. Owing to the radially outer constricted part of the fluid layer 19 as well as the limited movement of the contact lens over the cornea 12, the entrance of the dust or other floated objects in the atmosphere into the tear fluid layer 19 can be effectively prevented or restricted, resulting in an improved usability of the contact lens 10.

Figure 3:
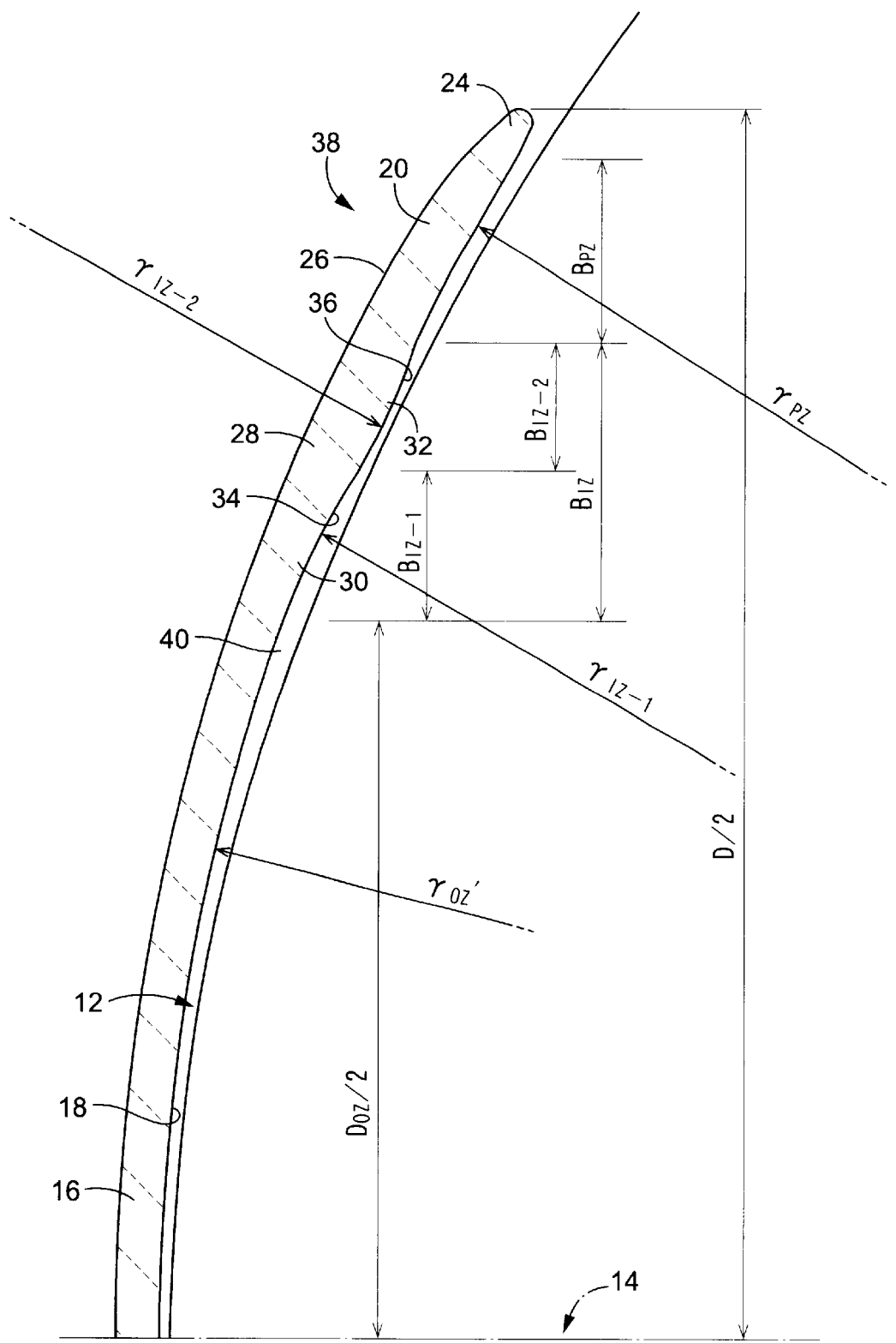
FIG. 3 is a fragmentary view in diametrical cross section of a contact lens according to a second embodiment of the present invention.

Referring next to FIG. 3, there is shown a contact lens 38 constructed according to a second embodiment of the present invention, which is usable for a so-called "orthokeratology" treatment. The same reference numerals as used in the first embodiment will be used in this embodiment to identify the functionally corresponding or structurally similar elements, which will not be described in detail to avoid redundancy of description.

Described in detail, the contact lens 38 is different from the contact lens 10 of the first embodiment in the radius of curvature of the back surface 18 of the optical zone 16. The contact lens 38 has a radius of curvature: $r_{oz}'$ of the back surface 18 of its optical zone 16 which is made larger than the radius of curvature: $r_{oz}$ of the back surface 18 of the optical zone 16 of the contact lens 10 in the first embodiment. With the contact lens 38 worn on the surface of the corner 12, the back surface 18 of the optical zone 16 of the contact lens 38 have the radius of curvature: $r_{oz}'$ which is larger than but not similar to that of the surface of the cornea 12.

With the contact lens 38 worn on the cornea 12, the optical zone 16 is located most closely adjacent to the surface of the cornea 12, like the convex portion 32 of the intermediate zone 28. in this condition, the central portion of the optical zone 16 and the convex portion 32 are forcedly pressed onto the surface of the cornea 12, upon application of an external pressing force on the front surface 26 of the contact lens 38, by the eyelids of the lens wearer as described above, for example. As is apparent from the diametrical cross sectional view of the contact lens 38 of FIG. 3, a radial portion interposed between the central optical zone 16 and the convex portion 32, namely, a radial area ranging from the intermediate zone of the optical zone 16 to the convex portion 32 of the intermediate zone 28 including the periphery of the optical zone 16, is spaced apart from the surface of the cornea 12 with a bridge-like shape as seen in the cross section of the contact lens 10. The presence of this radial portion interposed between the central optical zone 16 and the convex portion 32 permits a tear fluid concentration between the back surfaces 18, 22 of the contact lens 10 and the surface of the cornea 12, thereby providing an annular tear fluid reservoir 40 extending in the circumferential direction continuously over the entire circumference of the lens 38.

As is understood from the foregoing description, the contact lens 38 constructed according to the present embodiment is capable of reshaping the cornea 12 owing to the pressing contact of the central portion of the optical zone 16 with the cornea 12. Therefore, a given-term wearing of the contact lens 38 makes it possible to desirably change a dipodic power of the cornea 12 itself, thus assuring a correction or moderation of the myopic condition of the lens wearer even after a removal of the contact lens 38 from the cornea 12.

In the contact lens 38 of the present embodiment, the convex portion 32 disposed radially outwardly of the optical zone 16 is also located most closely adjacent to the cornea 12, like in the contact lens 10 according to the first embodiment. The convex portion 32 is forcedly pressed onto the cornea 12, whereby the contact lens 10 is effectively positioned relative to the cornea 12. Thus, the contact lens 38 assures an excellent lens wearing comfort as felt by the lens wearer, while effectively preventing or restricting the undesirable entrance of the dust or other objects in the atmosphere into the tear fluid layer 19.

In addition, the contact lens 38 is shaped for use in the orthokeratology treatment in which the lens is used to reshape the cornea 12. Therefore, the convex portion 32 adapted to forcedly press the peripheral portion of the cornea 12 functions to alter the central portion of the cornea 12 to protrude forward or toward the side of the contact lens 10, whereby the central portion of the cornea 12 is more strongly held in pressing contact with the optical zone 16. As a result, the central portion of the cornea 12 is forcedly pressed by the central portion of the optical zone 16 and is reshaped to have a dully-curved surface. Therefore, the contact lens 38 exhibits an excellent control reshaping effect in comparison with a known contact lens designed for the orthokeratology treatment, which has no convex portion 32, or the like.

In order to assure that the contact lens 38 exhibits a desired effect for the orthokeratology treatment, it is desired that the contact lens 38 is positioned on the cornea 12 such that the peripheral portion of the back surface 18 of the optical zone 16 is spaced apart from the surface of the cornea 12 and the outwardly curved surface 36 of the convex portion 32 is smoothly and sufficiently closely adjacent to the surface of the cornea 12 so that the contact lens 38 exhibits a desired effect for the orthokeratology treatment. To meet this end, the concave portion 34 formed at the inner circumferential portion of the intermediate zone 28 has a radius of curvature that is made smaller than that of the concave portion 34 formed on a contact lens designed for general visual-acuity improving purpose.

Figure 4:
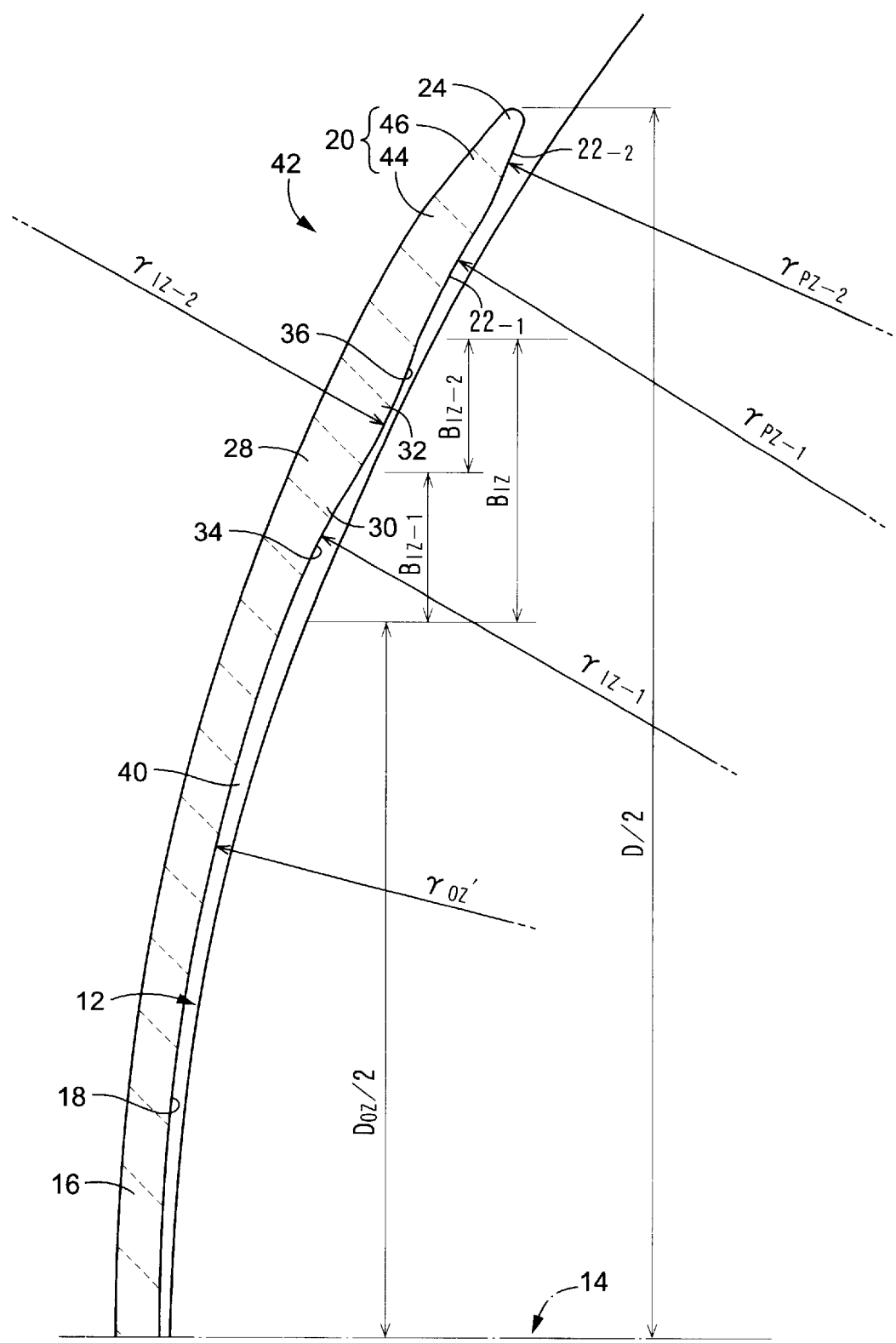
FIG. 4 is a fragmentary view in diametrical cross section of a contact lens according to a third embodiment of the present invention.

Referring next to FIG. 4, there is shown a contact lens 42 constructed according to a third embodiment of the invention, which is usable for the orthokeratology treatment. The same reference numerals as used in the second embodiment will be used in this embodiment, to identify the functionally corresponding or structurally similar elements, which will not be described in detail.

Described in detail, the contact lens 42 is different from the contact lens 38 of the second embodiment in the shape and radius of curvature of the back peripheral zone 22. In the contact lens 42 of the present embodiment, the peripheral zone 20 consists of a radially inner first peripheral zone 44 and a radially outer second peripheral zone 46, which join together at a radially intermediate zone of the peripheral zone 20. The first peripheral zone 44 has a back surfaces $22_{-1}$ whose radius of curvature: $r_{PZ-1}$ is made smaller than a radius of curvature: $r_{PZ-2}$ of a back surface $22_{-2}$ of the second peripheral zone 46. Preferably, the first and second peripheral zone 44, 46 have respective centers of curvatures located on the center axis 14 of the contact lens 42.

In the contact lens 42 according to the present embodiment, the presence of the first and second peripheral zones 44, 46 makes it possible to effectively reduce or minimize the thickness of the peripheral zone 20, especially at its outer peripheral portion, even in the condition where the convex portion 32 protrudes with a relatively large height from the back surface 18 of the optical zone 16 served as the base curve of the contact lens 42.

The contact lens 42 constructed according to this embodiment makes it possible to shape with ease the second peripheral zone 46 including the bevel 24 formed in the outer most circumferential portion of the contact lens 42. In addition, the first peripheral zone 44 effectively provides a sufficient wall thickness of the contact lens at a portion in which the peripheral zone 44 joins to the convex portion 32. This leads to a reduction in height difference between the convex portion 32 and the first peripheral zone 44. Therefore, the contact lens 42 of the present embodiment permits a good wearing comfort with high efficiency, even in the case where the convex portion 32 protrudes with a relatively large height from the back surface 18 of the optical zone 16 of the contact lens 42.

Figure 5:
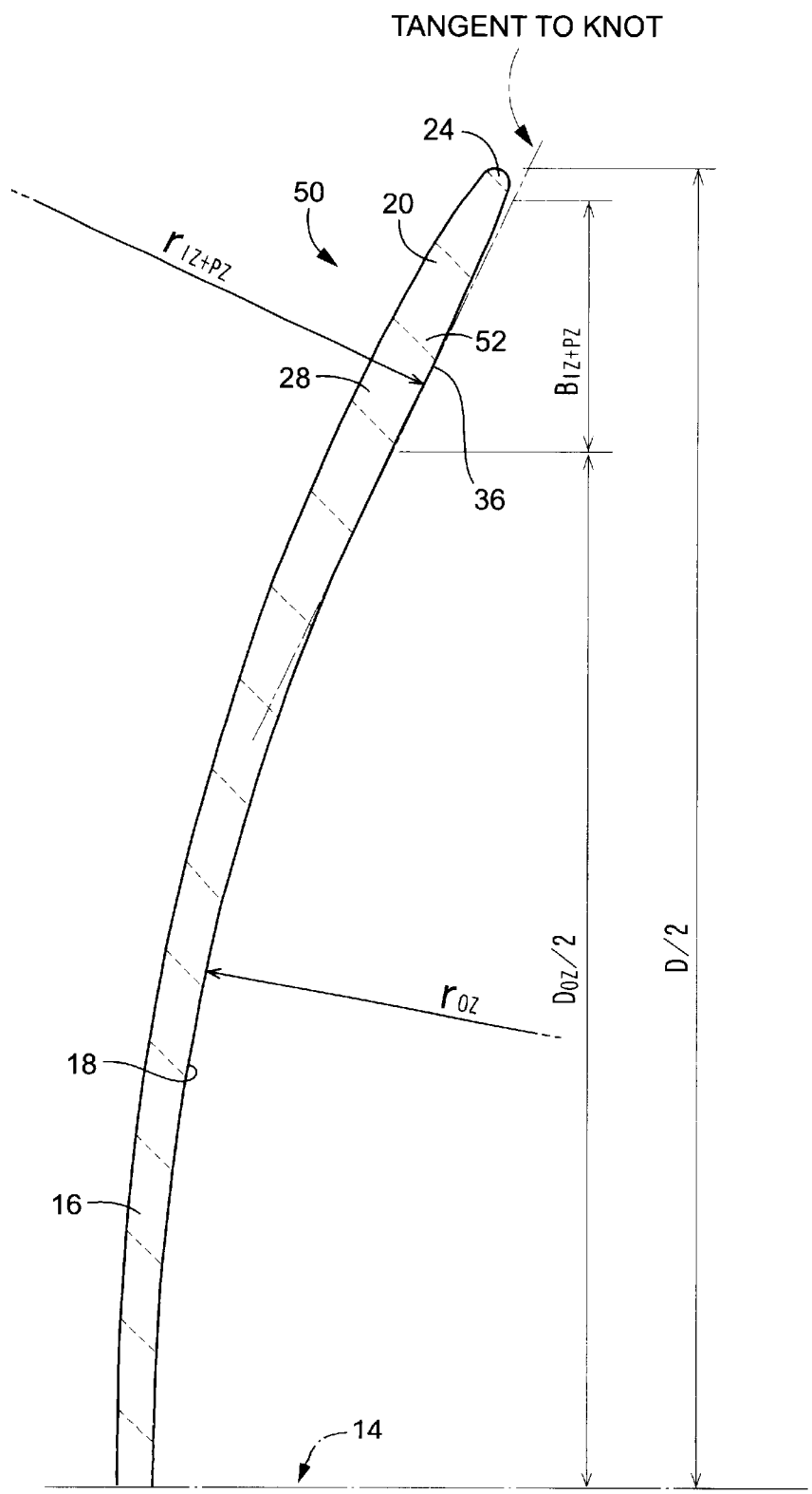
FIG. 5 is a fragmentary view in diametrical cross section of a contact lens according to a fourth embodiment of the present invention.

Referring next to FIG. 5, there is shown a contact lens 50 constructed according to a fourth embodiment of the invention. The same reference numerals as used in the first embodiment will be used in this embodiment, to identify the functionally corresponding or structurally similar elements, which will not be described in detail.

The contact lens 50 is different from the contact lens 10 of the first embodiment in the radius of curvature of each of the back surfaces of the intermediate zone 28 and the peripheral zone 20 (i.e., the back peripheral zone 22). In the contact lens 50 of the present embodiment, the back surface of the intermediate zone 28 smoothly protrudes or rises over its entire radial length as seen in the diametrical cross section of the contact lens 50 of FIG. 5, to thereby provide a convex portion 52. The surface of the convex portion 52, i.e., the back surface of the intermediate zone 28 provides a single outwardly curved surface 36 extending over the entire radial length of the intermediate zone 28.

The outwardly curved surface 36 is connected at its inner circumferential portion to the peripheral portion of the back surface 18 of the optical zone 16 along knots lie on tangents common to curves of the convex portion 52 and the back surface 18 of the optical zone 16. While the centers of curvatures of the outwardly curved surface 36 and the back surface 18 are located on the opposite sides of the contact lens 50 at the all knots, the outwardly curved surface 36 and the back surface 18 join together at the all knots with a smooth, peakless or junctionless curve.

The outwardly curved surface 36 is connected at its outer circumferential portion to the inner circumferential portion of the back peripheral zone 22 such that the back peripheral zone 22 is formed as a radially outwardly extending integral part of the outwardly curved surface 36. In this arrangement, the back surface of the intermediate zone 28 and the back peripheral zone 22 cooperate to form a single outwardly curved surface 36 extending over the entire radial length of the intermediate zone 28 and the peripheral zone 20. This extended outer circumferential portion of the outwardly curved surface 36 directly connected to the bevel 24.

This outwardly curved surface 36 radially extending over the intermediate zone 28 and the peripheral zone 20 may have an arcuate configuration with a substantially constant radius of curvature: $r_{IZ+PZ}$ in cross section taken in a plane parallel to a diametric direction of the contact lens 50. Alternatively, the outwardly curved surface 36 has a curve that is represented by conic sections or polynomials in which the radius of curvature: $r_{IZ+PZ}$ of the curve is gradually changed.

The contact lens 50 constructed according to the present embodiment enjoys an advantage of the convex portion 52 formed by cooperation of the intermediate zone 28 and the peripheral zone 20, as well as the advantages described above with respect to the contact lens 10 constructed according to the first embodiment. Namely, the presence of the convex portion 52 enables the outwardly curved surface 36 to have a sufficiently large radius of curvature in the radial direction, so that the convex portion 52 is pressed onto the cornea with a reduced or moderated pressing force, when the contact lens 50 is worn on the cornea.

In the contact lens 50 of the present embodiment, it is possible to form a vertex of the convex portion 52 to be most closely adjacent to the cornea on or around the knots between the peripheral portion of the back surface 18 of the optical zone 16 and the inner circumferential portion of the outwardly curved surface 36. This makes it possible to effectively provide the desired convex portion 52 even in the case where the outer diameter of the optical zone is made larger in comparison with the outer diameter of the contact lens 50, for example.

In addition, the peripheral portion of the back surface 18 of the optical zone 16 and the inner circumferential portion of the outwardly curved surface 36 join together along knots lie on tangents common to curves of the two portions. Accordingly, the vertex can be formed at or around the inner circumferential portion of the intermediate zone 28, while eliminating or minimizing undesirable pressure or stimulation concentration on the corresponding portion of the surface of the cornea. Thus, the contact lens 50 assures a good wearing comfort as felt by the lens wearer.

It is noted that the contact lens 50 of the present embodiment includes the single outwardly curved surface 36 radially extending over the back surface of the intermediate zone 28 and the peripheral zone 20. In this arrangement, the intermediate zone 28 and the peripheral zone 20 appear to cooperate to function as a single peripheral functioning portion. In this respect, the single peripheral functioning portion is preferably dimensioned to have a radial length: $B_{IZ+PZ}$ that is held within a range of 35–70% of the outer diameter: D of the contact lens 50, while the outer diameter: $D_{OZ}$ of the optical zone is preferably held within a range of 50–85% of the outer diameter: D of the contact lens 50.

Figure 6:
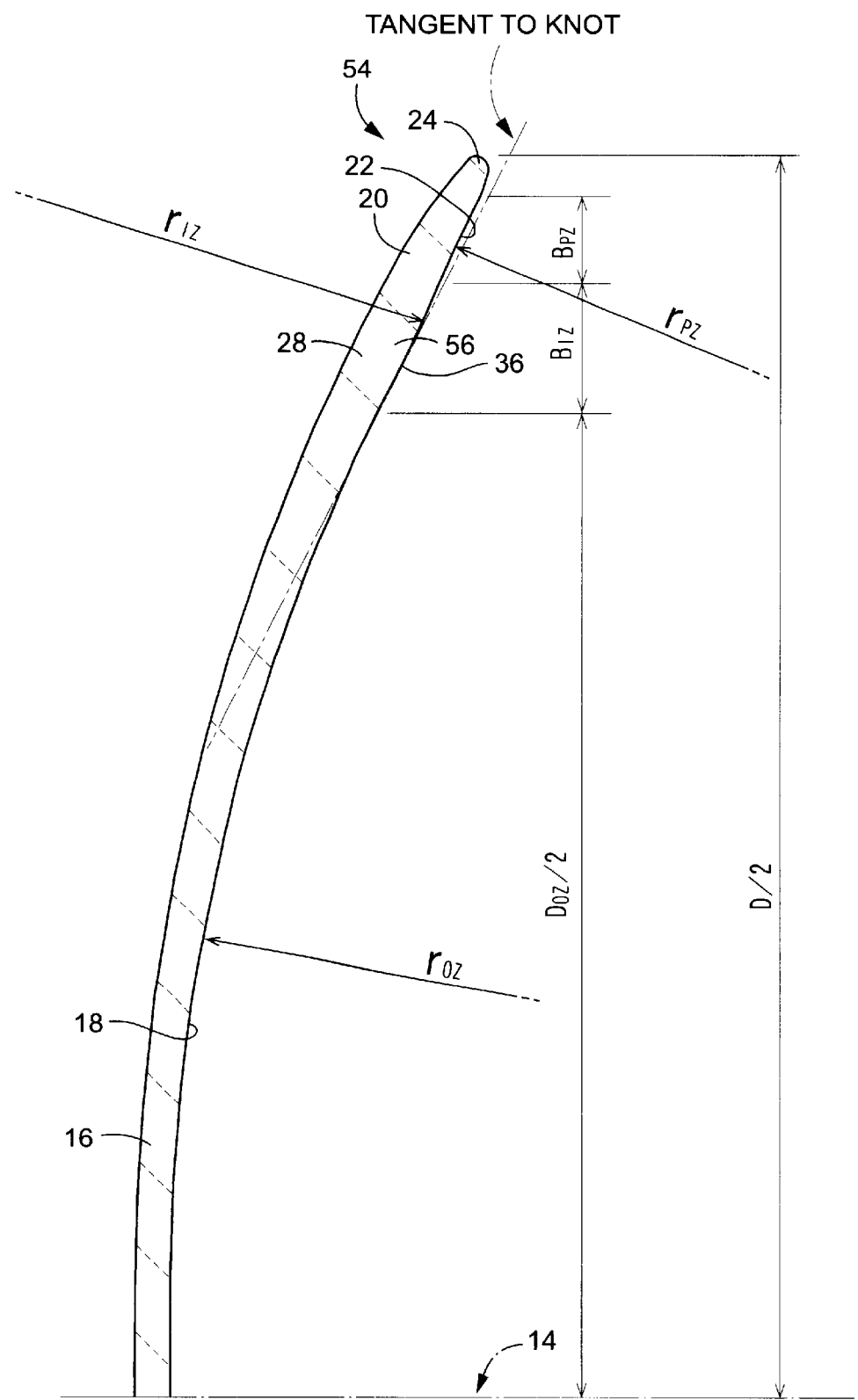
FIG. 6 is a fragmentary view in diametrical cross section of a contact lens according to a fifth embodiment of the present invention.

Referring next to FIG. 6, there is shown a contact lens 54 constructed according to a fifth embodiment of the invention. The same reference numerals as used in the first embodiment will be used in this embodiment, to identify the functionally corresponding or structurally similar elements, which will not be described in detail.

The contact lens 54 is different from the contact lens 10 of the first embodiment in the shape and the radius of curvature of the back surface of the intermediate zone 28. In the contact lens 54 of the present embodiment, the back surface of the intermediate zone 28 smoothly protrudes or rises over its entire radial length as seen in the diametrical cross section of the contact lens 54 of FIG. 6, to thereby provide a convex portion 52. The surface of the convex portion 52, i.e., the back surface of the intermediate zone 28 provides a single outwardly curved surface 36 extending over the entire radial length of the intermediate zone 28. In other words, the back surface of the intermediate zone 28 does not includes the inner concave portion 30 and the inwardly curved surface 34 thereof that is formed in the contact lens 10 of the first embodiment. Like the contact lens 50 according to the fourth embodiment of the invention, the inner circumferential portion of the outwardly curved surface 36 of the convex portion 52 directly connected to the peripheral portion of the back surface 18 of the optical zone 16.

Like the contact lens 50 according to the fourth embodiment of the invention, the outwardly curved surface 36 is connected at its inner circumferential portion to the peripheral portion of the back surface 18 of the optical zone 16 along knots lie on tangents common to curves of the two portions, with a smooth, peakless or junctionless curve.

On the other hand, the outwardly curved surface 36 is connected at its outer circumferential portion to the inner circumferential portion of the back peripheral zone 22. Like the contact lens 10 of the first embodiment, the back peripheral zone 22 has an inwardly curved surface whose center of curvature is located on the back side of the contact lens 10 (at the right-hand side of FIG. 6), and whose radius of curvature: $r_{PZ}$ of the back peripheral zone 22 is made equal to or slightly larger than the radius of curvature of the surface of the cornea 12 on which the contact lens 54 is worn, for example. Alternatively, the back peripheral zone 22 is formed as a straightly extending surface that is inclined by a given angle with respect to the center axis 14 of the contact lens 54, so that the peripheral zone 20 has a tapered shape in its entirety.

In the present embodiment, the outer circumferential portion of the intermediate zone 28 and the inner circumferential portion of the peripheral zone 20 create junctions where they join in the posterior surface of the contact lens 54, like the first embodiment. Alternatively, the outwardly curved surface 36 of the intermediate zone 28 and the back peripheral zone 22 may join with a continuous surface in the form of a smoothly curved surface, such that the smoothly curved surface joins at its inner circumferential portion to the outwardly curved surface 36 along knots lie on tangents common to curves of these two surfaces, and at its outer circumferential portion to the back peripheral zone 22 along knots lie on tangents common to curves of these two surfaces. The smoothly curved surface lies on tangents whose slopes are continuously changed as seen in the diametrical cross section of the contact lens 54 shown in FIG. 6. For instance, the smoothly curved surface has an arcuate configuration in the diametrical cross section. The outer circumferential portion of the back peripheral zone 22 directly joins to the bevel 24.

The outwardly curved surface 36 formed on the back surface of the intermediate zone 28 and the back peripheral zone 22 may have various kinds of curved configurations those represented by polynomials of not less than second-order, conic sections, trigonometric functions, and the like, other than the arcuate configuration employed in the illustrated embodiment, as seen in the diametrical cross section of the contact lens 54. In addition, the outwardly curved back surface of the intermediate zone 28 the inwardly curved or tapered back peripheral zone 22 can be integrally represented by polynomials of not less than third order.

The contact lens 54 constructed according to the fifth embodiment as described above can enjoy the same advantages of the present invention described above with respect to the contact lens 10 according to the first embodiment. In addition, the contact lens 54 makes it possible to form a portion in its posterior surface, which portion is to be nearest adjacent to the cornea when the contact lens 54 is worn on the cornea 12, on or around the knots between the peripheral portion of the back surface 18 of the optical zone 16 and the inner circumferential portion of the outwardly curved surface 36, like the contact lens 50 of the fourth embodiment.

While the presently preferred embodiments of the invention have been described above in detail for illustrative purpose only, it is to be understood that the invention is not limited to the details of the illustrated embodiment, but may be otherwise embodied.

For instance, the concave portion 30 and the convex portion 32 formed in the intermediate zone 28 may have a wide variety of shapes depending upon conditions of corneas of lens wearers. More specifically described, the concave portion 30 and the convex portion 32 may be shaped to have a diametrical cross sectional profiles such as quadratic curves, conic section including ellipses, sine curves, cosine curves and other curves represented by equations of not less than third order, rather than the arcuate shapes in the illustrated embodiments. This arrangement makes it possible that one shape is univocally set for the whole back surface of the intermediate zone 28 including the concave portion 30 and the convex portion 32.

While the outer circumferential portion of the convex portion 32 of the intermediate zone 28 and the inner circumferential portion of the peripheral zone 20 are connected to each other along non-common tangent points in the illustrated first, second and third embodiments, it may be possible that the convex portion 32 and the peripheral zone 20 may join together along knots lie on tangents common to curves of the convex portion 32 and the peripheral zone 20. This permits a further improved lens wearing comfort as felt by the lens wearer.

In the illustrated first, second and third embodiments, the inner circumferential portion of the intermediate zone 28 and the periphery of the optical zone 16 join together along knots lie on tangents common to both curves of the intermediate zone 28 and the optical zone 16, in the posterior surface of the contact lens. This arrangement is not essential to practice of the present invention. For instance, these intermediate zone 28 and the optical zone 16 may possible be connected to each other along non-common tangent points. In this case, the concave portion 30 is not necessarily needed to be formed in the intermediate zone 28. The inner circumferential portion of the convex portion 32 may be directly connected to the periphery of the optical zone 16.

It should be appreciated that configurations, areas, radius of curvatures of respective portions of a contact lens of the invention, and correlation between sizes of these portions are desirably determined. Namely, the optical zone 16, the peripheral zone 20, the intermediate zone 28, the concave and convex portions 30, 32 formed in the intermediate zone 28, and the first and second peripheral zones 44, 46 of the peripheral zone 20 are not particularly limited to the illustrated embodiment, but may otherwise be modified or changed as needed, taking into account condition of a cornea to which the lens is worn.

The center of curvature of the optical zone 16 is not necessarily located on the geometric center axis of the contact lens, but may be desirably positioned depending upon required optical characteristics of the contact lens.

It is also to be understood that the present invention may be embodied with various other changes, modification sand improvements, which may occur to those skilled in the art, without departing from the spirit and scope of the invention defined in the following claims.

What is claimed is:

1. A contact lens comprising:
   an optical zone having a generally circular shape;
   an peripheral zone having a generally annular shape and located around said optical zone; and
   an intermediate zone having a generally annular shape and interposed between said optical and peripheral zones,
   wherein said intermediate zone has a back surface provided with a convex portion formed in at least one diametrical position thereof and extending in a circumferential direction thereof with an outwardly curved surface in diametric cross section of said contact lens.

2. A contact lens according to claim 1, wherein said back surface of said intermediate zone has an inner circumferential portion connected to said optical zone and provided with a radially inner concave portion extending in a circumferential direction thereof with an inwardly curved surface in said diametrical cross section of said contact lens, said inwardly curved surface having a radius of curvature smaller than that of the optical zone and being connected at an outer circumferential portion to said convex portion.

3. A contact lens according to claim 2, wherein said radially inner concave portion formed on said back surface of said intermediate zone is connected at said outer circumferential portion thereof to an inner circumferential portion of said convex portion with a continuous surface which joins to said outer circumferential portion of said radially inner concave portion along knots lying on tangents common to curves of said radially inner concave portion and said continuous surface, and joins to said inner circumferential portion of said convex portion along knots lying on tangents common to curves of said convex portion and said continuous surface.

4. A contact lens according to claim 2, wherein said outwardly curved surface of said convex portion and said inwardly curved surface of said radially inner concave portion have respective arcuate configurations in said diametrical cross section of said contact lens.

5. A contact lens according to claim 2, wherein at least one of said outwardly curved surface of said convex portion and said inwardly curved surface of said radially inner concave portion has a configuration represented by any one of a conic section and a polynomial of not less than second order, in said diametrical cross section of said contact lens.

6. A contact lens according to claim 2, wherein said back surface of said intermediate zone including said convex portion and said radially inner concave portion has a configuration represented by any one of a polynomial and a trigonometric function in said diametrical cross section of said contact lens.

7. A contact lens according to claim 1, wherein said convex portion formed on the back surface of said intermediate zone is connected at an inner circumferential portion thereof to said optical zone with a first inwardly curve and at an outer circumferential portion thereof to said peripheral zone with a second inwardly curve, said convex portion at least partially protruding backward of said contact lens from both of a radially outward prolongation of said back surface of said optical zone and a radially inward prolongation of said back surface of said peripheral zone in said diametrical cross section of said contact lens.

8. A contact lens according to claim 1, wherein said convex portion formed on said back surface of said intermediate zone extends to an inner circumferential portion of said intermediate zone so as to be connected to said optical zone with a continuous surface which joins to said optical zone along knots lying on tangents common to curves of said optical zone and said continuous surface, and joins to said inner circumferential portion of said convex portion along knots lying on tangents common to curves of said convex portion and said continuous surface.

9. A contact lens according to claim 8, wherein only one of said convex portion is formed on said back surface of said intermediate zone so as to extend over an entire radial length of said intermediate zone.

10. A contact lens according to claim 1, wherein a posterior surface of said contact lens is arranged such that said intermediate zone is connected at an inner circumferential portion thereof to said optical zone with a first continuous surface which joins to said optical zone along knots lying on tangents common to curves of said optical zone and said continuous surface, and joins to said inner circumferential portion of said intermediate zone along knots lying on tangents common to curves of said intermediate zone and said continuous surface, while said intermediate zone is connected at an outer circumferential portion thereof to said peripheral zone with a second continuous surface which joins to said peripheral zone along knots lying on tangents common to curves of said peripheral zone and said continuous surface, and joins to said outer circumferential portion of said intermediate zone along knots lying on tangents common to curves of said intermediate zone and said continuous surface.

11. A contact lens according to claim 1, wherein said peripheral zone has a back surface including a plurality of concave parts that have respective arcuate configuration in the diametrical cross section of said contact lens whose radiuses of curvatures are different from each other, said plurality of concave parts being continuously connected to each other in a radial direction of said lens such that curvatures of said plurality of concave parts decrease as radial distances of said plurality of concave parts from said convex portion increase.

12. A contact lens according to claim 9, wherein a back surface of said peripheral zone is formed as an outwardly curved surface or a tapered surface straightly extending radially outwardly so that said back surface of said peripheral zone protrudes backward of said contact lens so as not to exceed a radially outward prolongation of said back surface of said intermediate zone.

13. A contact lens according to claim 1, wherein at least one of said intermediate zone and said peripheral zone, which are disposed radially outward of the said convex portion, is provided with a radially outer concave portion extending in a circumferential direction thereof with an inwardly curved surface in said diametrical cross section of said contact lens, said inwardly curved surface having a radius of curvature smaller than that of the optical zone.

14. A contact lens according to claim 1, wherein said back surface of said optical zone has a curvature that is made smaller than a curvature of a cornea on which said lens is worn, and a radially inner portion of said back surface of said intermediate zone located radially inward of said convex portion serves as a tear fluid reserving portion.

15. A contact lens according to claim 1, wherein said peripheral zone has an outer diameter within a range of 8–16 mm.

16. A contact lens according to claim 1, wherein said optical zone has a radial width within a range of 40–70% of a radius of the contact lens, and said intermediate zone has a radial width within a range of 20–45% of said radius of the contact lens, while said peripheral zone has a radial width within a range of 5–25% of said radius of the contact lens.

17. A contact lens according to claim 1, wherein said contact lens is made of a rigid gas-permeable rigid material.

18. A contact lens according to claim 1, wherein said contact lens has a shape of a solid of revolution about a center axis thereof.

19. A contact lens according to claim 1, wherein said back surface of said optical zone has an arcuate configuration in said diametrical cross section of said lens whose center of curvature is located on an center axis of said lens, and said intermediate zone of said annular shape has a center which is located on said center axis of said lens.

20. A contact lens according to claim 1, wherein said contact lens is adapted for use in an orthokeratology treatment.

21. A contact lens according to claim 1, wherein the convex portion is formed at a thickest part of the contact lens.

* * * * *